United States Patent [19]

Jursich

[11] Patent Number: 5,672,827
[45] Date of Patent: Sep. 30, 1997

[54] METHOD FOR MEASURING THE FLOW RATE OF A SPECIES CONTAINED IN AN EXHAUST GAS STREAM OF A COMBUSTION PROCESS

[75] Inventor: Gregory M. Jursich, Clarendon Hills, Ill.

[73] Assignee: American Air Liquide Inc., Walnut Creek, Calif.

[21] Appl. No.: 481,104

[22] Filed: Jun. 7, 1995

[51] Int. Cl.$^6$ .................................................. G01F 1/70
[52] U.S. Cl. .................................................. 73/861.07
[58] Field of Search ........................... 73/861, 861.04, 73/861.07

[56] References Cited

U.S. PATENT DOCUMENTS

| | | | |
|---|---|---|---|
| 3,545,270 | 12/1970 | Chang | 73/861.04 |
| 3,881,351 | 5/1975 | Pracher . | |
| 3,934,470 | 1/1976 | Amati et al. | 73/861.07 |
| 4,121,455 | 10/1978 | Haslett et al. | 73/861.07 |
| 4,167,870 | 9/1979 | Haas | 73/861.07 |
| 5,292,280 | 3/1994 | Janu et al. . | |

FOREIGN PATENT DOCUMENTS

| | | | |
|---|---|---|---|
| 0118618 | 9/1981 | Japan | 73/861.07 |
| 60 225029 | 4/1986 | Japan . | |
| 94/27118 | 11/1994 | WIPO . | |

*Primary Examiner*—Robert Raevis

[57] ABSTRACT

Provided is a method for determining gas flow rates in an exhaust gas stream from a combustion process by measuring the amounts of a tracer gas inherently present in a gas used in the combustion process at a point upstream from the exhaust gas and at a point in the exhaust gas stream itself. The flow rate is determined by comparing the concentration of the tracer gas at the two points using a mass balance. Flow/emission of a particular species in the exhaust gas is determined by using the present method upon measuring the concentration of the species in the exhaust gas. The most preferred tracer gases include helium and argon.

2 Claims, 1 Drawing Sheet

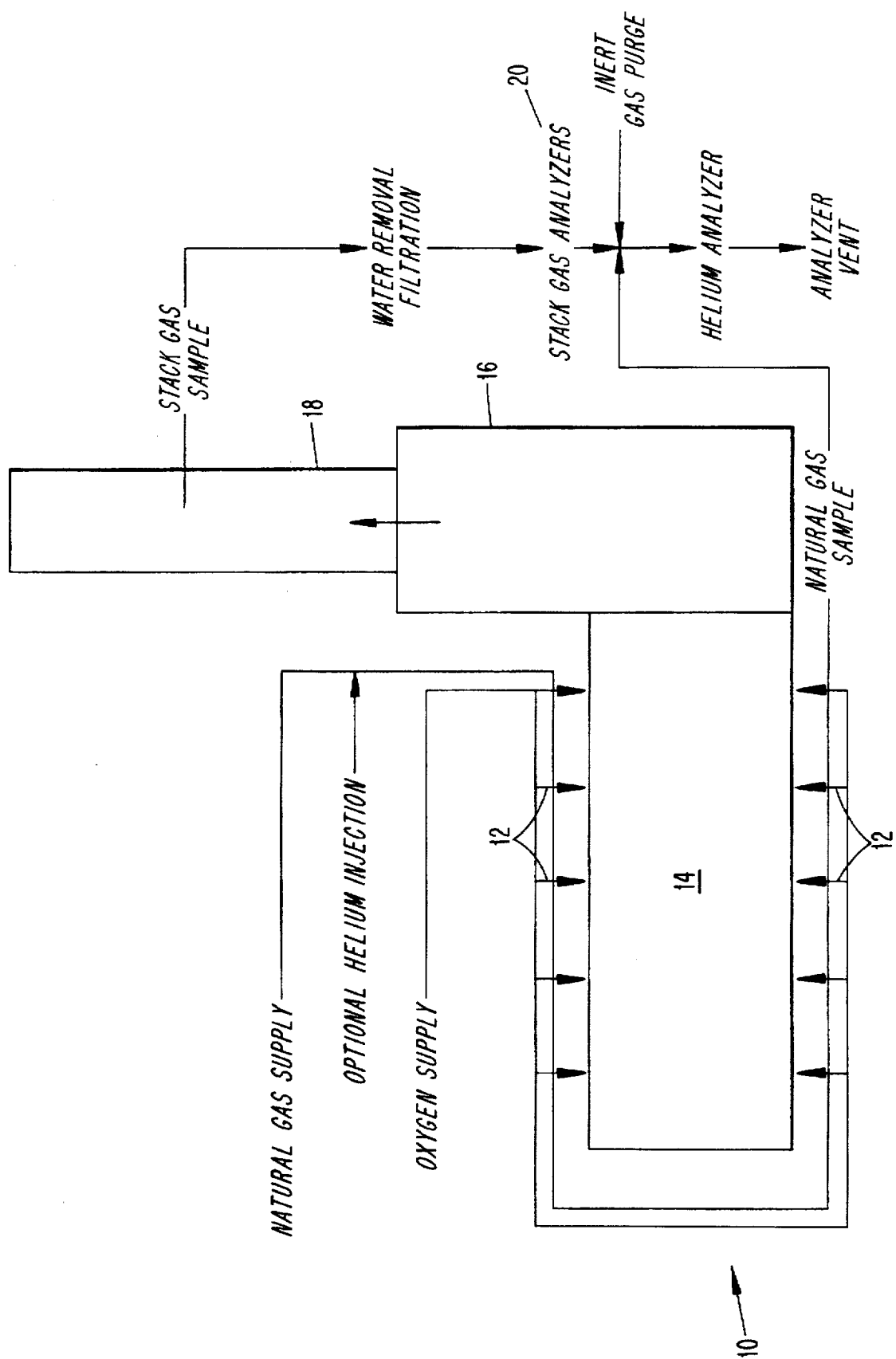

METHOD FOR MEASURING THE FLOW RATE OF A SPECIES CONTAINED IN AN EXHAUST GAS STREAM OF A COMBUSTION PROCESS

BACKGROUND OF THE INVENTION

The present invention relates to a method for measuring gas flow rates in industrial exhaust stacks, such as exhaust stacks for combustion furnaces, such as glass combustion furnaces. The present invention more particularly relates to a process for measuring the gas flow rate of a species contained in an exhaust gas generated by the combustion process.

Stack flow measurements are often required by environmental regulatory agencies for air emission monitoring. With increasing environmental concerns on air emissions from industrial processes, there is a strong need to know precisely the quantity of certain gaseous species released into the atmosphere. Of these species, $NO_x$ (such as NO and $NO_2$) and $SO_x$ (such as $SO_2$ and $SO_3$) are of greatest concern due to their contribution to photochemical air pollution and the generation of acid rain. Many countries have stringent limits on levels of these species that can be released into the environment.

In order to enforce these air emission limits, environmental regulatory policies require frequent (if not continuous) measurements of the air emission levels of certain regulated species. To do this, the concentration of these species must be measured by sampling at the source (e.g., in an exhaust stack), along with the flow of gas at the same location as the gas sampling. Different methods of flow measurement and sampling of exhaust stacks are known and disclosed in the literature. For example, see *Industrial Ventilation*, 20th Edition, 1988, Ch. 9, pp 9-1 to 9-28. Method 1—*Sample and Velocity Traverses for Stationary Sources*, NSPS Test Method, United States Environmental Protection Agency, Technical Support Division, OAQPS, Emission Measurement Technical Information Center, Technical Document, EMTIC TM-001, Dec. 15, 1988, and references within. *Method 1A—Sample and Velocity Traverses for Stationary Sources with Small Stacks or Ducts*, NSPS Test Method, United States Environmental Protection Agency, Technical Support Division, OAQPS, Emission Measurement Technical Information Center, Technical Document, EMTIC TM-001A, Feb. 14, 1989, and references within. *Method 2—Determination of Stack Gas Velocity and Volumetric flow Rate (Type S Pitot Tube)*, NSPS Test Method, United States Environmental Protection Agency, Technical Support Division, OAQPS, Emission Measurement Technical Information Center, Technical Document, EMTIC TM-002, Feb. 3, 1989, and references within. *A Word About Stack Emissions for Plant Managers*, American Glass Review, pp 7–9, November, 1992.

As discussed in the foregoing publications, generally, a sampling site from which flow rate is to be measured is selected based on the following criteria. In the case of tubular ducts or stacks, the location of the site must be at least 8 stack or duct diameters downstream and two diameters upstream of any flow disturbance resulting from any bend, expansion, or contraction in the stack. In the case of rectangular stacks or ducts, the sampling site must be a certain distance from any flow disturbance defined by D according to the equation, $$D=2\ L\ W/(L=W),$$

where L and W are the cross sectional dimensions of the stack or duct.

After the sampling site is selected, 8 to 12 gas velocity measurements need to be taken at various points within the cross sectional area of the stack or duct in order to assess the gas velocity profile at this sampling location. The gas velocity can be determined from the differential pressure measured with a directional probe or pitot tube device. A standard manometer or equivalent device can be used to measure the differential pressure when it is 0.05 in $H_2O$ or more. For lower gas velocities where differential pressure is less than 0.05 inches $H_2O$ a more sensitive differential pressure gauge must be used subject to the approval of the administrator.

Whereas the concentration measurements are generally straightforward, the measurement of flow is not. One reason is that typically, the gas analyzers used for this application measure concentration of regulated species on a dry basis (with moisture removed from gas samples) whereas the conventional gas flow measurements are on a wet basis (with moisture present).

In most cases the moisture content in stacks is quite significant, as high as 10–30% by volume. To calculate the quantity of species released into the atmosphere, the gas flow measurement must be corrected to indicate effective gas flow with a moisture content similar to that present in the analysis. Moreover, the flow methods used in industrial stacks today, such as pitot tubes and thermal conductivity, actually measure superficial gas velocity, not volumetric flow, and as such all require a determination of gas velocity profile across the stack diameter in order to calculate overall volumetric flow rate. To achieve this, the measurements must be made within a straight section of stack or duct at least several diameters away from any geometrical changes which can lead to turbulent or non-uniform gas profiles. Only then can overall gas flow be calculated from the velocity profile and the cross sectional area of the stack.

Because of this requirement, most air emissions measurements must be done in very inconvenient locations such as the middle section of large industrial stacks. In addition to the geometrical requirements of the stack or duct, there is also a minimum gas velocity limit. The actual value of this limit is determined by the pertinent environmental regulations involved but generally the limit is set around several feet per second. This minimum gas velocity limit, however, cannot always be achieved in a practical manner.

A notable example is the case of combustion furnaces, such as glass furnaces, being converted from air-combustion to oxygen combustion. Driven by higher fuel costs and the lower acceptable air emission limits, particularly of $NO_x$, more and more industries using combustion are converting from air-fuel to 100% oxygen-fuel combustion whereby higher fuel efficiency and lower $NO_x$ production is achieved simultaneously by drastically reducing the nitrogen content in the combustion chamber. In the process of this conversion the volume of air emission is also reduced which in turn reduces the gas velocity limit below acceptable levels for stack flow measurements by conventional methods. It then becomes difficult if not impossible to determine if the emissions are in compliance with environmental laws and as a result environmental protection agencies cannot adequately enforce air emission regulations. The only alternative approach would be to estimate flow rate from calculations which predict stack gas flow based on several process parameters.

The most fundamental problem in the current methods used today such as pitot tube devices, and mass flow devices as described in the literature referred to above, is that these all directly determine gas velocity, not volumetric flow. And as such, one requires to assess the gas velocity profile across the stack, duct, or other sampling location in order to determine volumetric flow. Here is where significant errors can be introduced and what limits the prior techniques in sampling location and gas velocity range. In order to best assess the gas velocity profiles in prior art methods several measurements are required across the diameter or width of the stack or duct. The larger the cross sectional area the more traverse sampling points are required. In some cases this can be as high as 20 to 40 measurements to determine one volumetric flow as indicated in Section 9.4.9 of the above-mentioned *Industrial Ventilation* reference.

Another disadvantage of the prior art methods is that they are easily influenced by particulate deposition and corrosion. This makes them far more susceptible to error in very dirty and/or corrosive gas atmospheres such as that typically found in industrial stacks. In the case of pitot tube methods, even partial plugging of the orifice from which pressure drop is measured will greatly affect the measured gas velocity because typically very low pressure drops are measured. In the case of mass flow velocity measurements, any particulate deposition or corrosion assisted surface oxide formation will also lead to significant error in interpreting gas velocity from the thermal heat loss of the sensor.

Another method for the determination of air flow is disclosed in *Industrial Ventilation*, 20th Edition, 1988, Ch. 9, §9.4.9. The process disclosed includes the continuous metering of tracer gas into one or more intake ports (hood or duct openings) along with the entering air stream. After thorough mixing and system equilibrium has been established, air samples are collected at some point downstream—usually at or near the effluent point—and the concentration of the tracer gas in the exit stream is determined. The rate of air flow is readily calculated from the degree of dilution noted in the exit and feed gas concentrations (rate of air flow equals rate of feed divided by tracer gas concentration). The tracer gas disclosed is selected on the basis of the following: (1) ease of collection and analysis, (2) not present naturally in the process being studied, (3) not absorbed chemically or physically in the duct system, (4) non-reactive with other constituents of the gas stream, and (5) non-toxic or non-explosive. The traditional approach of doing tracer gas measurement to determine flow is not feasible for long term or continuous monitoring of large industrial flow rates such as present in industrial stacks.

Hence, there remains a need in the art for a method of measuring gas flow rate in an exhaust stack which is independent of the effects of turbulence and moisture, and which can measure gas flow over a wide range of gas velocities, including very low velocities.

SUMMARY OF THE INVENTION

It is accordingly an object of the invention to provide a method of measuring the flow of exhaust gas from an industrial process which does not require the measured flow to be free of turbulence.

It is another object of the invention to provide a process, as above, which does not require correction for the amount of moisture in the exhaust gas.

It is still another object of the invention to provide a process, as above, which can be used over a broad range of gas flow velocities.

Yet another object of the present invention is to provide a process where the emission rate of a species of the exhaust gas is measured by measuring the degree of dilution of a naturally occurring species in the process.

Still another object of the present invention is to provide a process for measuring gas flow rate which does not require the injection of a gas foreign to the exhaust gas.

These objects are achieved by a method of determining gas flow in which a tracer gas already present in the exhaust gas (in other words naturally occurring) is used for flow measurement. The tracer gas exists in the combustion furnace upstream of the exhaust gas stream, as it is preferably a naturally occurring component of a gas used in the combustion process. While the tracer gas is already present in the feed to the furnace, a supplemental amount may be injected separately, if preferred. The concentration of the tracer gas is measured both at a point prior to entry into the exhaust flow and in the exhaust flow itself. Calculation of the exhaust gas flow rate is then based on a mass balance determined by the ratio of concentration of tracer gas at the two measuring points, multiplied by the flow rate of the gas going into the furnace which has the naturally occurring tracing species of interest. The concentration of any other species in the exhaust gas stream can then be measured, with the flow rate of the species being determined by multiplying the measured concentration of the species by the calculated flow rate of the exhaust gas. This information thereby provides the emission rate of the particular species.

In a preferred embodiment, the method of the present invention is applicable to combustion processes utilizing either natural gas with helium as the tracer gas since helium does occur naturally in natural gas, or oxygen or oxygen enriched air comprising argon. The method is preferably applicable to determining the flow rate and hence emission rate of undesirable species in the exhaust gas of such combustion processes, such as $NO_x$ and $SO_x$ species.

BRIEF DESCRIPTION OF THE DRAWING

The single FIGURE of the Drawing is a schematic representation of an oxy-combustion furnace employing the method of the invention.

DETAILED DESCRIPTION OF THE PREFERRED EMBODIMENTS

In the method of the invention, a tracer gas is measured and the degree of dilution at the point of gas flow determination is made by measuring its concentration. The tracer gas is a novel, inert gas which is contained in the gases used in the combustion process, and therefore need generally not be added to the system. If, however, more of the tracer gas is desired, a supplemental amount can be added.

Unlike prior art methods which directly measure gas velocities, the approach of the present invention is independent of gas velocity, and so there is no requirement for a uniform gas velocity profile. Hence, measurements can be made anywhere along the flow path involved and with any gas velocity. This is of particular importance in the combustion industry where operating furnaces are converting from air-combustion to oxygen-combustion which drastically reduces the flow rate of exhaust gas released into the atmosphere.

Moreover, in the method of the present invention, any corrosion or partial plugging of the sampling probe will not affect the tracer gas concentration. It will only alter the gas sample flow to the analyzers. Hence the method of the present invention is more suitable for more particulate-laden, corrosive gases as that often found in industrial stacks.

Further, given the magnitude of flow rates involved, 100's scfm (standard cubic feet per minute) to 100,000's scfm, the quantity of tracer gas required can be quite substantial considering that the practical measurements of such gases at industrial sites must be at least 10 ppm to obtain accurate values with readily available, inexpensive instrumentation. Even higher levels of tracer gas are required if the tracer gas is already present in the exhaust gas. For example, for a 10,000 scfm exhaust flow, approximately 1500 scf/day of tracer gas is required to have a 100 ppm tracer gas concentration in the exhaust. This large consumption rate of tracer gas makes implementation of such a method more awkward to implement on a continuous or long term basis as is often required by environmental regulations.

The tracer gas, which is selected so as to be neither consumed nor generated, is diluted in the exhaust stream, and the degree of dilution directly determines the gas flow at the point of sampling. The degree of dilution is simply determined from knowing the actual flow of tracer gas going into the process and the actual concentration of the tracer gas at the point where gas flow is to be determined. Mathematically, this can be expressed as a simple mass balance:

$$[TG]_{out} *F_{out}=[TG]_{in} *F_{in}$$

where $[TG]_{in}$ and $[TG]_{out}$ are the concentrations of tracer gas going into and out of the process respectively and $F_{in}$ is the corresponding flow rate of gas going into process whereas $F_{out}$ is the total flow going out of the process. $F_{out}$ is the corresponding gas flow of the total exhaust gas required by environmental agencies.

The flow rate of a particular species in the exhaust gas is then determined by measuring the concentration of the species in the exhaust gas stream and multiplying the measured concentration of the species by the flow rate of the total exhaust gas. The species is generally a species which is monitored by the EPA, such as $NO_x$ or $SO_x$. The method of the present invention therefore allows one to monitor the flow and hence the amount of the species being released via the exhaust gas. Adjustments in the combustion process can accordingly be made.

Such a method of determining gas flow has no geometrical stack constraints or requirements for sampling location. In addition and most importantly, there are no gas velocity range requirements. And lastly, since it is based on extractive gas analysis procedure (just as the regulated gas species are analyzed), both flow and species concentration data are on the same moisture basis and no additional correction for moisture is required to calculate the quantity of regulated species emitted from the stack.

The only requirement in the dilution approach is to preserve mass balance of the tracer gas itself. In extremely reactive conditions like combustion, this tracer gas must be extremely inert. In this case, rare gases are well suited, particularly helium and argon due to their relatively lower cost and availability as compared to the other rare gases. Other gases can also be used provided that they are suitably inert. One skilled in the art can readily select an appropriate tracer gas for a particular process. Helium and argon are, however, the most preferred.

Other tracer gases which can be used are other rare gases such as krypton, xenon and neon. However cost and availability of using these gases limits the practicality to lower flow systems. $CO_2$, being a fairly inert gas, can be a suitable tracer gas in certain applications as well. In principle, any gas can be used as long as it does not disturb the system and is not consumed or generated in the process. One of ordinary skill in the art knowledgeable of a given process can identify a suitable tracer gas for flow determination. Such identification depends on the process being considered.

In addition, such inert gases will not perturb or alter the process taking place. In the inventive method, the tracer gas is already present, and optionally more can be deliberately added. As to means of analysis, numerous suitable analyzers already exist in the commercial market today to measure the concentration of these gases. Examples of such analyzers are gas chromatographs and mass spectrometers. The preferable mass spectrometers would be that referred to as residual gas analyzers with atmospheric pressure sampling accessories. In the specific case of using helium as the tracer gas, a preferred analyzer is a helium leak detector used with an atmospheric pressure sampling accessory.

In combustion processes, it is quite common to be using a fuel or combustion gas which contains a suitable tracer gas for purposes of the present invention. For example, in furnaces operating on natural gas combustion, one suitable tracer gas present would be helium in the natural gas itself. Typically, depending on the geographical source of the natural gas, the helium content can vary from a few hundred to a few thousand ppm which is sufficient for use as a tracer gas. In this case, it is necessary only to monitor natural gas flow rate and to measure the amount of helium in the natural gas which can be done with many types of commercial analyzers available today. If desired, however, helium can be optionally added to supplement that already present.

A suitable tracer gas available in oxy-combustion is argon, which is an impurity often present in the oxygen supply. The concentration of argon can vary from a thousand ppm to several percent, e.g., up to about 5% by volume, depending on the means by which the oxygen was produced. For example, the oxygen can be obtained by separation from nitrogen (air separation) either cryogenically or by using an Oxygen Pressure Swing Adsorption Unit ($O_2$ PSA) or an $O_2$ VSA (Vacuum Swing Adsorption Unit). When a VSA or PSA procedure is used, the oxygen is generally delivered with about 5% volume argon in it.

Similarly, as with helium in natural gas, the argon concentration in the oxygen and the total flow rate into the furnace can be monitored, and from this the exhaust flow rate is calculated. However, any contribution of argon in the process from the introduction of air must be accounted for. Air typically contains 0.93% argon which may or may not be significant compared to the argon from oxygen itself.

In other applications such as air combustion, a third potential source of tracer gas is the argon present in air itself (again, typically 0.93%). In this case, however, total flow of air into the process must be known. In certain processes air flow can be determined accurately but often times this is not the case, and hence this embodiment of the invention has limited applicability.

Regardless of whether argon or helium is used as a background source, it is possible that a supplemental amount may be desired to insure accurate measurements with this method. In that case, an additional supply of helium or argon would be desirable in order to supplement the amount in the background sources. This would still be preferable to adding helium or argon in significant excess over the background and treating background level as just a constant. It is preferable to measure background sources directly and add its contribution to the background level of tracer gas into the process.

A preferred embodiment of the invention is shown in the FIGURE of the Drawing, wherein a combustion furnace operating on natural gas fuel and pure oxygen is indicated generally by the number 10. The furnace 10 operates with a ratio of natural gas to oxygen of 1:2 with a total natural gas firing rate of 15,000 scfh (standard cubic feet per hour) from burners 12 placed along the sides of a furnace chamber 14. The resulting flue gas flows into a port 16 of the stack 18 where it is diluted with air. This is a typical combustion furnace arrangement except that there are generally additional gases emitted from the process materials being heated.

The total flow of gas in the stack 18 is determined by tracing helium. This requires determining the quantity of helium going into the furnace and the helium concentration in the stack. In this case, the helium concentration in the natural gas (typically 200–800 ppm) is monitored at 20 and compared with what is found in the stack 18.

In cases where stack gases contain excessive water vapor (i.e. above ambient dew point), many analytical instrumentation (both for tracer gas measurements and pollutants) require removal of water from the sample gas below dew point in order to avoid water condensation in the instruments. Typically, this is done with a water collection device maintained below ambient temperature placed along the gas sampling line, preferably close to the sampling location. In cases where there is a high degree of particulates, a gas filter is also used to prevent such particulates from reaching such instrumentation and affecting its performance. Furthermore, in applications where the stack gases contain corrosive constituents it is often advantageous to periodically purge the analytical instrumentation with dry inert gas so as to minimize such corrosion in the instruments themselves thereby maintaining best optimal performance and to check instrument zero reading. All of these sample gas conditioning, instrument purging and calibration considerations are well established methods used in extractive stack gas sampling methods used today and anyone skilled in the art can assemble such equipment in an appropriate manner for any specific application. In the proposed method of low measurement it is particularly advantageous to share such; gas conditioning equipment for the tracer gas analyzer and the other analyzers used to measure the pollutants or other gases of interest although this is not necessarily a requirement. The sample applies for instrument calibration as well.

Since the flow of natural gas is known (15,000 scfh), the volume of helium going into the furnace is simply natural gas flow rate times the concentration of helium in the natural gas. This product divided by concentration of helium in the stack yields stack gas flow directly. This assumes no substantial amount of helium is present in the oxygen, which is generally true in most cases and is true for air as well. If helium were present in the oxygen its contribution as well would need to be measured as well.

To measure helium from the two sources (natural gas and stack), separate analyzers can be used or, preferably, one analyzer which alternates samples automatically. The latter arrangement not only saves on instrument costs but results in the same instrument sensitivity response for both sample sources. This in turn results in less error in correcting long term sensitivity drifts compared to the use of two analyzers.

Generally, the method of the invention provides for a wider range of gas velocity measurement than existing prior art methods and has no sampling location requirements. It also measures flow rates on the same moisture content basis as other required stack gas analyses performed by extractive sampling. This eliminates the error associated with modifying gas flow measurements based on estimated water levels so as to have the same moisture basis as gas analysis.

The method of the present invention, in its use of tracer gases which are inherently present in combustion system gases as residues or impurities, avoids the drawbacks of the prior art having to completely inject a tracer gas into the gas flow. For example, in the gas of large industrial systems, e.g., 100,000 scfm, a substantial injection of additional gas (tracer gas) would be generally required, e.g., 100 scfm. For a continuous analysis system in such a large system, the consumption of tracer gas is significant and costly. It is also impractical because one would need separate storage facilities, conduit and control systems for the tracer gas. The method of the present invention avoids these problems efficiently and effectively.

In order to further illustrate the present invention and the advantages thereof, the following specific examples are given, it being understood that same are intended only as illustrative and in nowise limitative.

EXAMPLE 1

Helium levels of 400 ppm in the natural gas and 100 ppm in the stack are measured in an apparatus as illustrated in the FIGURE of the Drawing. The stack flow is calculated to be 15,000 scfh (400 ppm/100 ppm) or 60,000 scfh. This assumes there is no significant contribution of helium from air which has 5.2 ppm helium. Since 100 ppm of helium is observed in the stack at most the contribution of helium from air in this example would be 45,000 scfh of air. This represents only 4% contribution of helium from air. Also in this example, because the helium is measured in the stack after removal of water, the flow determined from helium analysis is on the same moisture basis as the analysis itself. This is an advantage since no correction for different moisture levels between flow measurement and gas analysis is required in order to determine quantity of specific gas species released into the atmosphere.

To further test the method, from time to time, if desired, more helium can be added to the process and the increase in helium level measured in the stack. In this case the flow of helium injected divided by the change of helium concentration determines the stack flow. For example in the present case, if 6 scfh helium is injected into the furnace and 100 ppm increase in helium is observed in the stack, then the stack flow would be 6 scfh (100%)/100 ppm He or 60,000 scfh. Here, absolute (not relative) concentrations of helium must be used. Such duplicate measurements are useful in verifying natural gas flow rate used and the assumption that there are no other sources of helium in the process.

EXAMPLE 2

Example 1 is repeated except that argon is used as a tracer gas in place of helium. Oxygen can have up to several percent argon in it depending on the method of generation and post purification. If 5% argon is present in the oxygen and 2.5% argon is observed in the stack, then the stack flow would be 30,000 scfh (5%/2.5%) or 60,000 scfh. This assumes there are no other sources of argon involved. Generally, natural gas itself does not contain percent levels of argon but air does (viz., 0.93%). Thus, the argon contribution from air can be significant. In a worst case, where all dilution of gases in the stack is from air, the argon contribution from air is 28% that of argon from oxygen, and so the argon from air should be included in the calculation. If air dilution into the stack is measured to be 45,000 scfh, then the calculation for stack gas becomes 30,000 scfh (5%/2.5%)+ 45,000 scfh (0.93%/2.5%) or 76,740 scfh. Again, if all sources of argon cannot be quantified then it is necessary to inject additional argon into the process and measure the change of concentration as indicated before with helium or use a different tracer gas entirely.

The above Examples 1 and 2 illustrate that the stack flow can be determined from dilution of a tracer gas even when high flow rates typically found in various industrial processes are involved. The examples also show how the method of the present invention can be used for a combustion furnace application using helium or argon, although the method is not limited to combustion applications nor use of rare gases only. As another example of a tracer gas, $CO_2$ from the combustion of various carbon containing fuels can be used as long as the degree of combustion is complete or well known and there is no additional production or consumption of $CO_2$ in the process.

EXAMPLE 3

Flow measurements were made on a 1.6 MMBTU combustion furnace operating on pure oxygen and natural gas. In this case the flow was determined by measuring helium in the natural gas fuel and at the exhaust of the furnace. Table 1 below summarizes the results of these measurements. The natural gas flow was measured to be 1657 scfh and the concentration of helium was found to be around 400 ppm at the time of this test. Three sets of measurements were made for the helium concentration at the exhaust of the furnace which indicated exhaust flow rates ranging from 1788 to 1862 scfh (±2% of median).

EXAMPLE 4

The measurements of flow in Example 3 require accurate knowledge of the natural gas flow rate. In cases where it is not known accurately or when all sources of helium going into the furnace are not known, additional helium can be added to the furnace in known amounts and the flow of exhaust gas can be determined by measuring the difference in helium concentration observed. Such data is indicated in Table 2 for the same furnace operating under the same conditions as in Example 3. In Table 2 the flow rates determined by helium injection ranged from 1758 to 1817 scfh (±1.6% of median). The difference in the averaged result in the two sets of data fall within 2%. This indicates extremely good precision compared with conventional pitot tube and thermal conductivity measurements.

TABLE 1

Summary of Exhaust Gas Flow Data Using Helium in Natural Gas

| Trial | Helium in Natural Gas (ppm) | Helium in Exhaust Gas (ppm) | Measured Flow Based on Helium (scfh) |
|---|---|---|---|
| 1 | 409 | 364 | 1862 |
| 2 | 386 | 351 | 1822 |
| 3 | 409 | 379 | 1788 |

Average measured flow: 1824 scfh

TABLE 2

Summary of Exhaust Gas Flow Data Using Helium Addition Method

| Helium Added (scfh) | Helium Measured in Exhaust Gas (ppm) | Exhaust Flow Determined by Helium Analysis (scfh) |
|---|---|---|
| 0.519 | 1708 | 1758 |
| 0.757 | 2244 | 1817 |
| 1.511 | 4060 | 1806 |

Average measured flow: 1794 scfh

EXAMPLE 5

By measuring the concentration of $CO_2$ in the exhaust and verifying negligible CO contribution, exhaust flow can be calculated based on $CO_2$ in exhaust gas and the amount of natural gas entering the furnace since lack of CO indicates combustion is complete. For example, in a case where, 92.0% $CO_2$ was observed in the exhaust, since the natural gas consists of 95% $CH_4$, 2.5% $C_2H_6$, 0.4% $C_3H_8$, 1.7% $N_2$, and 0.7% $CO_2$, there should be 1.02 ft$^3$ of $CO_2$ produced for every ft$^3$ of natural gas consumed. For a natural gas flow rate of 1657 scfh, there is 1690 scfh of $CO_2$ produced. (The actual exhaust flow is greater than this due to the few percent excess $O_2$ present and some dilution of air.)

In considering the 92% concentration of $CO_2$ measured in the exhaust, the exhaust flow rate is 1836 scfh which falls within 2% of the average data from either Table 1 or 2. Although the above calculation is valid for the Examples described it is generally not valid for most industrial combustion processes because very often the materials heated generate considerable amount of $CO_2$.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method for continuously measuring the flow rate of a species contained in an exhaust gas stream from a combustion process using natural gas as fuel, comprising the steps of (a) measuring the concentration of helium inherently present in the natural gas on a continuous basis at a first point in a combustion furnace in which the combustion process takes place upstream of the exhaust gas stream;

(b) measuring the concentration of the helium at a second point in the exhaust gas stream on a continuous basis;

(c) calculating the flow of the exhaust gas stream by mass balance using the concentrations of helium at the first point and the second point;

(d) measuring the concentration of the species in the exhaust gas stream on a continuous basis in a location where the flow rate of the exhaust gas is substantially similar to the flow rate of the exhaust gas at the second point; and (e) determining the flow rate of the species by multiplying the measured concentration of the species with the flow calculated in (c).

2. The method as claimed in claim 1, wherein the species is $NO_x$ or $SO_x$.

* * * * *